W. Luker,
Animal Trap.
No. 96,821. Patented Nov. 16, 1869.
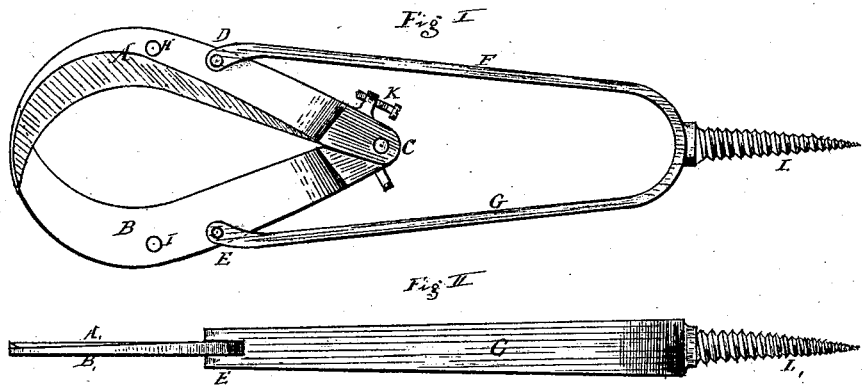
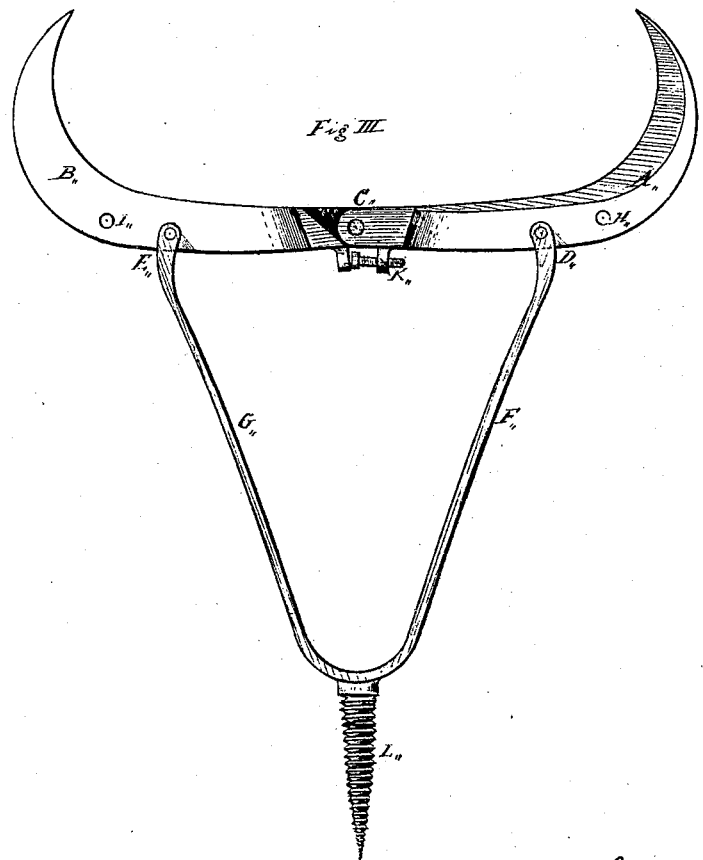
Witnesses:
B. Barnes
J. E. Sherwood
William Luker
Inventor.

United States Patent Office.

WILLIAM LUKER, OF KALAMAZOO, MICHIGAN.

Letters Patent No. 96,821, dated November 16, 1869.

IMPROVED ANIMAL-TRAP.

The Schedule referred to in these Letters Patent and making part of the same.

*To all whom it may concern:*

Be it known that I, WILLIAM LUKER, of Kalamazoo, in the county of Kalamazoo, in the State of Michigan, have invented an Improved Animal-Trap; and I do hereby declare that the following is a full and exact description thereof, reference being had to the accompanying drawings, and to the letters of reference marked thereon—

Figure I representing the trap in a closed position;
Figure II, a side view; and
Figure III showing the trap open.

My invention consists of two curved knives, A and B, connected with each other by a hinge, C, and hinging respectively at D and E with the arms F and G of a V-shaped spring.

The latter keeps the knives closed, as shown in Fig. I, unless they are drawn apart, which can be done by means of two strings drawn through the holes H and I.

If opened wide enough, the knives will snap in the hinge, and remain in the open position, (see Fig. III,) but the slightest touch on the upper side of the hinge will close the knives rapidly, which thus become a most effective trap for animals.

The degree of sensibility may be changed by means of the adjusting-screw K. If the head-end of this screw be sufficiently short, the centre of the hinge C will be allowed, in opening the knives, to surpass the imaginary straight line connecting D with E, and the spring will not close the knives unless a blow is given on the upper side of the hinge C, so as to bring its centre below the centre line D E. But by unscrewing the screw K, the instrument may be so adjusted that C will surpass by but very little or not at all the centre line D E, and the slightest touch will now suffice to spring the trap.

The spring F G is provided, at its lower end, with a screw L, to screw it on a board, which is put into the ground, so that the trap stands upright over the ground.

After it has been set, sticks are put into the ground on both sides, so as to form a circle, which has its only opening at the place where the trap is set.

The sticks being higher than the trap, the animal will have to put its neck over the trap in order to get the bait inside of the circle, and will be caught and killed as soon as it touches it.

What I claim as my invention, and desire to secure by Letters Patent, is—

The hinged curved knives A B, provided with screw K, in combination with the spring F G and screw L, constructed and arranged to operate as herein described.

WILLIAM X LUKER.
his mark.

Witnesses:
A. E. SHERWOOD,
B. BARNES.